(12) United States Patent
Breiling

(10) Patent No.: US 6,628,726 B1
(45) Date of Patent: Sep. 30, 2003

(54) DEVICE AND METHOD FOR GENERATING A TRANSMIT SEQUENCE AND DEVICE AND METHOD FOR DETERMINING AN INFORMATION WORD FROM A RECEIVED TRANSMIT SEQUENCE

(75) Inventor: Marco Breiling, Erlangen (DE)

(73) Assignee: Fraunhofer-Gesellschaft zur Foerderung, der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/507,473

(22) Filed: Feb. 17, 2000

(30) Foreign Application Priority Data

Dec. 2, 1999 (DE) .......................................... 199 58 210

(51) Int. Cl.⁷ ........................... H04K 1/10; H04L 27/28
(52) U.S. Cl. ..................................................... 375/260
(58) Field of Search ................................ 375/260, 261, 375/295, 298, 284, 285; 370/479, 487, 498

(56) References Cited

U.S. PATENT DOCUMENTS 6,038,261 A   3/2000   Mestdagh ................... 375/285

FOREIGN PATENT DOCUMENTS

| DE | 69325126 | 3/1993 | ............ H04N/7/00 |
| DE | 19625054 | 6/1996 | ............ H04J/13/02 |
| DE | 2 758 030 | 12/1996 | ............ H04J/11/00 |
| DE | 19808993 | 3/1998 | ............ H04L/27/32 |
| EP | 0 702 466 A2 | 3/1996 | ........................ 5/6 |
| WO | 96/19055 | 6/1996 | ........................ 5/6 |
| WO | WO 98/10567 | 3/1998 | ............ H04L/27/26 |
| WO | 99/29078 | 6/1999 | ..................... 27/26 |
| WO | 00/72543 | 11/2000 | ..................... 27/26 |

OTHER PUBLICATIONS

Van Eetvelt, P. et al; *Peak to Average Power Reduction for IFDM schermes by Selective Scrambling*; Oct. 10, 1996; Electronic Letters.

(List continued on next page.)

Primary Examiner—Mohammad H. Ghayour
(74) Attorney, Agent, or Firm—Michael A. Glenn; Glenn Patent Group; Kirk D. Wong

(57) ABSTRACT

To achieve a distortionless reduction in the out-of-band radiation a plurality of candidate transmit sequences is generated from an information word and one of the candidate transmit sequences, which fulfills a predetermined criterion, is then selected as the transmit sequence. The different candidate transmit sequences are generated by adding respective different labels to the information word and the information word plus added label is then processed by an invertable back-coupled combination algorithm to obtain a combined information word wherein the information units are combined with one another and/or with the added label in such a way that the combined information word is uniquely identified by the label. The combined information word is further processed, e.g. with the aid of a mapper and an inverse Fourier transform in the case of an OFDM modulation method, to obtain a temporal candidate transmit sequence. By repeating the above process the plurality of candidate transmit sequences is obtained, from which the actual transmit sequence is then selected according to a predetermined criterion. In the receiver the combined information word is fed into an algorithm which is inverse to the back-coupled combination algorithm and which is automatically controlled by the label, thus regenerating the information word. In this way the information word is automatically extracted from the received transmit sequence without transmitting explicit side information.

25 Claims, 11 Drawing Sheets

OTHER PUBLICATIONS

Breiling, M., et al; *Distortionless Reduction of Peak Power Without Explicit Side Information*; Nov. 27, 2000; GLOBALCOM '00 IEEE Global Telecommunications Conference.

Bruce Carlson; *Communications Systems*; 1986; Mc Graw Hill International Editions, Singapore.

Zogakis, T., J. Aslanis, Jr., and J. Cioffi, *A Coded and Shaped Discrete Multitone System*, 1995, IEEE.

Von Dr. Ing. M. Bossert, *Kanalcodierung*, 1998, B.G. Teubner Stuttgart.

Rappaport, T., *Wireless Communications Principles and Practice*, 1996, Prentice Hall PTR.

DEVICE AND METHOD FOR GENERATING A TRANSMIT SEQUENCE AND DEVICE AND METHOD FOR DETERMINING AN INFORMATION WORD FROM A RECEIVED TRANSMIT SEQUENCE

FIELD OF THE INVENTION

The present invention relates to digital transmission and in particular to concepts for reducing the out-of-band radiation of digital transmitters.

BACKGROUND OF THE INVENTION

In general a digital transmitter comprises an information source, which e.g. might be an MPEG audio encoder for digital radio or an MPEG video encoder for digital television. The output data of the source, which exist in the form of a digital bit stream, are then typically encoded with the aid of a channel encoder so as to introduce the bit stream redundancy which enables transmission errors to be overcome in the receiver. Following this the channel-coded digital bit stream is fed into a so-called "interleaver", which alters the sequence of the data according to an algorithm which is known to the receiver so that so-called burst errors in the transmission channel do not lead to the loss of a fairly large contiguous part of the message but only to smaller short losses which are spread over a larger time interval. The interleaved bit stream at the output of the interleaver is then imaged in the form of modulation symbols With the aid of a so-called mapper according to the type of modulation used.

If modulation is not employed, and the digital bit stream is effectively transmitted directly without modulation, the mapper and also the modulator which succeeds it can be dispensed with.

If a modulation method is employed, however, e.g. a multicarrier modulation method, the mapper is succeeded by a modulator, which modulates the modulation symbols onto the carrier.

Recently the OFDM method for digital radio applications has become increasingly popular. In this method a plurality of subcarriers is employed onto which the modulation symbols formed by the mapper are modulated. Here the modulation method is an inverse discrete Fourier transform, which, as is known, is used to generate a discrete time signal from the many modulated carriers. The discrete, normally complex time signal exists in the form of complex sampled values or "samples", which are then fed into an interpolation low-pass in order to remove the periodically repeating spectral contributions. The signal at the output of the interpolation low-pass is typically modulated onto a HF carrier frequency by means of a complex IQ modulator to obtain a HF signal which is fed into a transmitter amplifier which feeds the amplified signal to an antenna which radiates the signal.

In radio applications tube amplifiers such as klystrons or travelling wave tubes are typically used in view of the high power requirements at the output of the amplifier. If smaller powers are acceptable, as in mobile radio e.g., where there is a dense network of transmitters, transistor amplifiers can also be used.

A property which transistor amplifiers and tube amplifiers have in common is that they are linear only over a certain input power range and have an output power curve which falls off at larger input powers and finally levels off at a constant value when the amplifier reaches complete saturation. Put another way, since its characteristic is non-linear, the amplifier causes non-linear distortions of the input signal at higher input powers.

In situations where a certain frequency band has been allocated for a particular transmission application, e.g. through a public licensing authority, regulations stipulate that the transmission signal for the particular licensed transmission application may only carry power within a prescribed band and that there must be no, or very little, power outside the allotted band. The power outside the allotted band is also called out-of-band radiation.

The non-linear characteristic of the amplifier at higher input powers leads, as already mentioned, to non-linear distortions, whose nature is such that the amplifier generates higher harmonics which no longer lie within the allotted band but outside the band and which can be measured as out-to-band radiation.

It is known that these non-linear distortions produce a relatively white spectrum. If the input signal in the amplifier is also band-limited, which is to be expected e.g. for OFDM modulation, the output signal will then possess power outside this band.

To avoid this, i.e. to comply with the licenser's regulations for the tolerance schemes specified for the frequency bands, i.e. how much out-of-band radiation outside the allotted band is still acceptable, the input voltage into the amplifier should exceed the maximum input voltage for a distortionless amplification as seldom as possible and preferably not at all. In other words this means that the maximum input voltage actually occurring should be as small as possible. If the maximum input voltage is always smaller than the maximum voltage at which the amplifier still operates linearly or only amplifies non-linearly to such a small extent that its out-of-band radiation lies below the permitted value, distortions which lead to an out-of-band radiation which exceeds the permitted value never occur.

A disadvantage of the OFDM method described at the outset is the typically large ratio of peak power to average power, also referred to as PAR (PAR=Peak to Average Power Ratio). Large peaks in the time signal, i.e. in the modulation symbol after the IDFT, can occur if the occupation of the carriers happens to be so unfavourable that e.g. all the 256 OFDM subcarriers overlap constructively at a particular instant. In this case there will be a large signal peak which may easily lie 10 to 20 dB above the average signal power. To comply with the permitted out-of-band radiation despite this, a high power margin, also referred to as "power back-off", is typically maintained in the transmitter amplifier. Put another way, the amplifier is operated at a working point which is fixed low enough that even a high power peak still falls within the linear range of the amplifier.

This operating mode of an amplifier is an extremely inefficient operating mode in which the amplifier, while requiring considerable supply power, only delivers a relatively small output power. The requirement of low out-of-band radiation in conjunction with high peak values in the time signal, which occur not only for an OFDM modulation but also e.g for a single-carrier method through a pulse shaper, i.e. which can occur generally when filtering, means that expensive amplifiers are needed, which must be operated with a high power margin and which have a low efficiency. However, for smaller battery-operated systems in particular the efficiency is also a point of ever increasing concern, especially with regard to mobile radio and the accumulators with limited storage capacity which are employed there.

DESCRIPTION OF PRIOR ART

WO 98/10567 relates to a method for reducing the peak value factor for digital transmission methods. The basic idea consists in already taking measures on the digital side to ensure that signal peaks which are too high do not occur in the time signal, so that smaller power margins suffice for the transmitter amplifier without resulting in out-of-band radiation which exceeds the permitted limit. The known concept is generally referred to as selected mapping. Selected mapping or SLM really means just that, from a message for transmission, i.e. an information word or more generally speaking a vector of data bits, in some way or other U different possible signals are generated, which can also be termed representatives or candidate transmit sequences. Not all of these signals are transmitted, however. Instead a special signal is selected as the transmission signal. In particular, each transmission signal has a peak value, which is measured. The candidate transmission signal with the lowest peak value is then chosen as the actual transmission signal and is transmitted.

At the receiver the object is now to discover a) what the message is and b) which of the U possible representatives was transmitted per message. There are two possible ways in which the receiver can do this. First, by means of side information, which is communicated to the receiver by the transmitter in some way or other and which relates to which of the U candidate transmit sequences has been chosen. A disadvantage of this method is the explicit transmission of this side information and in particular the fact that this side information must be especially well protected against transmission errors. In the case of a digital radio transmission, where the channel can be disturbed in all sorts of ways and is therefore hard to predict, this is not a trivial matter.

If the side information is wrongly received, the received signal cannot be processed without error. This fact means that this possibility of signalling by means of side information is relatively impracticable.

Another possibility is to effect the concept without the transmission of side information. The receiver must then discover from the received signal alone which message of M messages, i.e. which modulation symbol from a predetermined number of modulation symbols, is present and which of the U candidate transmit sequences was sent per message. Instead of M possible transmission signals or modulation symbols from which the receiver has to pick out the most probable, M·U possible transmission signals must be considered in the absence of side information. As a result the error probability can increase considerably in certain circumstances. In addition a suitable choice of the U possible candidate transmit sequences per message is not a trivial problem. To date no suitable solution to this problem has been found, so that transmission without explicit side information is also not yet practicable.

A special variation of SLM which is also described in WO 98/10567 is known as the PTS concept (PTS=Partial Transmit Sequences). The U-candidate transmit sequences are obtained in the following way. Before the transmission signal is finally subjected to linear filtering, e.g. spectral shaping in the case of single-carrier methods or an inverse Fourier transform in the case of OFDM, it is present in the form of a discrete-time signal, i.e. as a vector of elements with complex values. The vector is now partitioned into subsets, i.e. into partial transmit sequences. The elements of each subset can then be multipled by the same complex number of magnitude 1. All these elements are rotated through the same angle in the complex plane. Linear filtering then takes place, through which the high peak values are typically first generated. As a result of the free choice of the complex number which is used for the multiplication, the plurality of candidate transmit sequences can now be generated. Here, too, the two possibilities which have been described above exist, namely whether side information is employed or not. The difference here, however, is that it is not necessary to transmit explicit side information. This is possible because the information to be transmitted is not transmitted absolutely in the complex-value elements of the discrete-time transmission signal but in quotients of successive elements of the same subset. This concept is generally referred to as differential preceding. Since all the elements of a subset have been multiplied by the same complex number, the quotient of two successive elements of the same subset remains the same for each of the U candidate transmit sequences. The receiver must therefore calculate only these quotients to regain the transmitted information.

A disadvantage of the general SLM concept is that it is only practicable in the form it is known at present if side, information is transmitted as well. This is a critical matter, however, in view of the fact that the side information must be specially protected.

Although the PTS concept does not require the transmission of side information, it suffers nevertheless from the disadvantage that it is only practicable in the case of differential precoding. The PTS concept thus considerably curtails the design possibilities for digital transmitters and digital receivers.

Furthermore, measures must be taken in the receiver to perform a power-efficient difference decoding. A receiver must therefore be modified considerably, which may lead to expensive receivers. However, it is precisely in the field of digital radio receivers that the cost of the receivers, which are a mass-produced item, is an important consideration, since even small price advantages can be decisive in consumer markets in determining whether a product survives in the market or not.

SUMMARY OF THE INVENTION

The object of the present invention consists in providing a practicable solution to the problem of out-of-band radiation.

In accordance with a first aspect of the present invention, this object is achieved by a device for generating a transmit sequence comprising a unit for forming a plurality of candidate transmit sequences from the information word, each candidate transmit sequence carrying the same information as the information word, where the unit for forming comprises the following features: a unit for adding a label to the information word; a unit for processing the information word plus added label by means of an invertable back-coupled combination algorithm to obtain a combined information word wherein the information units are combined with one another and/or with the added label in such a way that the combined information word is uniquely identified by the label; and a unit for further processing the combined information word to obtain a temporal candidate transmit sequence, where the unit for forming is furthermore so adapted as to generate the plurality of distinct candidate transmit sequences from the same information word with the aid of different labels; and a unit for investigating the plurality of candidate transmit sequences so as to select from the plurality of candidate transmit sequences the candidate transmit sequence which fulfills a predetermined criterion to be the transmit sequence.

In accordance with a second aspect of the present invention, this object is achieved by a device for generating a transmit sequence from an information word with a plurality of information units, comprising: a unit for forming a plurality of candidate transmit sequences from the information word, each candidate transmit sequence carrying the same information as the information word, where the unit for forming comprises the following features: a unit for adding a dummy label to the information word; a unit for processing the information word plus added dummy label by means of an invertable back-coupled combination algorithm to obtain a combined information word wherein the information units are combined with one another and/or with the added dummy label; a unit for linking the combined information word or a word derived from the combined information word with a linking sequence which is determined from a label using the same back-coupled combination algorithm so as to obtain a linked information word which is unambiguously identified by the label; and a unit for further processing the linked information word to obtain a temporal candidate transmit sequence, where the unit for forming is furthermore so adapted as to generate the plurality of distinct candidate transmit sequences from the same information word with the aid of different linking sequences which are determined from different labels; and a unit for investigating the plurality of candidate transmit sequences so as to select from the plurality of candidate transmit sequences the candidate transmit sequence which fulfills a predetermined criterion to be the transmit sequence.

In accordance with a third aspect of the present invention, this object is achieved by a device for determining an information word from a received transmit sequence which has been generated by processing the information word and a label by means of an invertable back-coupled combination algorithm, comprising; a unit for processing the received transmit sequence by means of an inverse algorithm to the invertable back-coupled combination algorithm so as to obtain a sequence which contains the information word and the label; and a unit for extracting the label from the sequence so as to obtain the information word.

In accordance with a fourth aspect of the present invention, this object is achieved by a method for generating a transmit sequence from an information word with a plurality of information units, comprising the steps of: forming a plurality of candidate transmit sequences from the information word, each candidate transmit sequence carrying the same information as the information word, where the step of forming comprises the following substeps: adding a label to the information word; processing the information word plus added label by means of an invertable back-coupled combination algorithm to obtain a combined information word wherein the information units are combined with one another and/or with the added label in such a way that the combined information word is uniquely identified by the label; and further processing the combined information word to obtain a temporal candidate transmit sequence, and where the step of forming is furthermore performed so as to generate the plurality of distinct candidate transmit sequences from the same information word with the aid of different labels; and investigating the plurality of candidate transmit sequences so as to select from the plurality of candidate transmit sequences the candidate transmit sequence which fulfills a predetermined criterion to be the transmit sequence.

In accordance with a fifth aspect of the present invention, this object is achieved by a method for generating a transmit sequence from an information word with a plurality of information units, comprising the steps of: forming a plurality of candidate transmit sequences from the information word, each candidate transmit sequence carrying the same information as the information word, where the step of forming comprises the following substeps: adding a dummy label to the information word; processing the information word plus added dummy label by means of an invertable back-coupled combination algorithm to obtain a combined information word wherein the information units are combined with one another and/or with the added dummy label; linking the combined information word or a word derived from the combined information word with a linking sequence which is determined from a label using the same back-coupled combination algorithm so as to obtain a linked information word which is unambiguously identified by the label; and further processing the linked information word to obtain a temporal candidate transmit sequence, where the step of forming is furthermore performed so as to generate the plurality of distinct candidate transmit sequences from the same information word with the aid of different linking sequences which are determined from different labels; and investigating the plurality of candidate transmit sequences so as to select from the plurality of candidate transmit sequences the candidate transmit sequence which fulfills a predetermined criterion to be the transmit sequence.

In accordance with a sixth aspect of the present invention, this object is achieved by a method for determining an information word from a received transmit sequence which has been generated by processing the information word and a label by means of an invertable back-coupled combination algorithm, comprising the steps of: processing the received transmit sequence by means of an inverse algorithm to the invertable back-coupled combination algorithm so as to obtain a sequence which contains the information word and the label; and extracting the label from the sequence so as to obtain the information word.

The present invention is based on the finding that the problem of the out-of-band radiation can be overcome through a special generation of the candidate transmit sequences.

According to the present invention the generation of the candidate transmit sequences is achieved by means of an invertable back-coupled combination algorithm, which not only processes the information word from which a plurality of candidate transmit sequences are generated, all of which contain the same information as the information word on which they are based, but which also processes a label, the individual candidate transmit sequences being unambiguously identified by the label used in their generation. Back-coupled combination algorithms have the property that they deliver different output values depending on the particular initial conditions in the feedback path of the combination algorithm.

To put the matter another way, for the same input values completely different output vectors are obtained with the same combination algorithm, the different output vectors resulting solely because the combination algorithm with feedback adopts different respective states according to the labels. If the labels appear as a prefix at the start of the information word, the information word is processed starting from a start state of the combination algorithm which is determined by the label. If the label appears elsewhere in the information word, the candidate transmit sequences will not differ until the label is encountered. As soon as the different label enters the combination algorithm, a sort of "branching" takes place in the combination algorithm, resulting in the various candidate transmit sequences. When account is taken of the fact that an interleaver is normally employed, which performs scrambling anyway, it becomes clear that it is immaterial in the final analysis whether the candidate transmit sequences are identical in a section at the front and differ only in a section at the end.

The label is added to the information word itself, so that both the information word and the label are processed by the back-coupled combination algorithm in such a way that the label is essentially contained implicitly in each candidate transmit sequence.

Put another way, the labels are used to drive the invertable back-coupled combination algorithm into a state, the number of states into which the back-coupled combination algorithm and thus the memory of the combination algorithm can be driven depending on the properties of the feedback path. Since each candidate transmit sequence contains a different label, each candidate transmit sequence is processed by the back-coupled combination algorithm starting from a different state as it were. The label in the candidate transmit sequence is no longer explicitly visible, however. It only reappears if the corresponding candidate transmit sequence in the receiver has been subjected to processing by an algorithm which is the inverse of the algorithm in the transmitter and which thus has a forward coupling property.

After the processing by the inverted back-coupled combination algorithm in the receiver, the label, although it is explicitly present, is no longer needed since it has already done its duty so to speak by driving the forward-coupled combination algorithm, which is inverse to the algorithm in the transmitter, into its appropriate initial state, which forms the basis for the received transmit sequence.

An advantage of the present invention is that it is not necessary to transmit side information explicitly. The label is indeed implicitly transmitted in the candidate transmit sequence, but it does not have to be particularly protected. It should also be noted that normally channel encoding to introduce redundancy in the transmitter and an interleaving operation on the information word are performed, so that the label is also protected automatically through the same measures as the information word itself without additional effort.

A further advantage of the present invention is that adding the label only results in the addition of a small amount of further redundancy. To give a numerical example: for a concept requiring 16 representatives, a redundancy of only 4 bits is added to an information word of e.g. 512 bits in the case of an OFDM with 256 carriers, which corresponds to a further redundancy of less than 1%, depending on the number of carriers used.

The spectral properties in regard to the transmitter amplifier non-linearities improve as the number of candidate transmit sequences which are generated increases, i.e. the more different states the back-coupled combination algorithm can assume. In general, signal statistics improvements of such an order that the transmitter amplifier power margin can be reduced by values in the order of 2 dB can be achieved with as few as 16 different candidate transmit sequences.

A further advantage of the present invention is that it can be implemented in the receiver with little effort, is robust and thus suitable for practical application.

Another important advantage of the present invention is that the concept according to the present invention is not restricted one or to a small number of modulation types but is generally suitable for diverse forms of channel encoding and for all types of modulation. Generation of the candidate transmit sequences with the aid of an invertable back-coupled combination algorithm thus provides the developer with the maximum design flexibility as regards the type of modulation which is employed, the channel encoding which is employed and the components used in the receiver.

BRIEF DESCRIPTION OF THE DRAWINGS

Preferred embodiments of the present invention are described in detail below making reference to the enclosed drawings, in which.

DETAILED DESCRIPTION OF THE INVENTION

Figure 1:
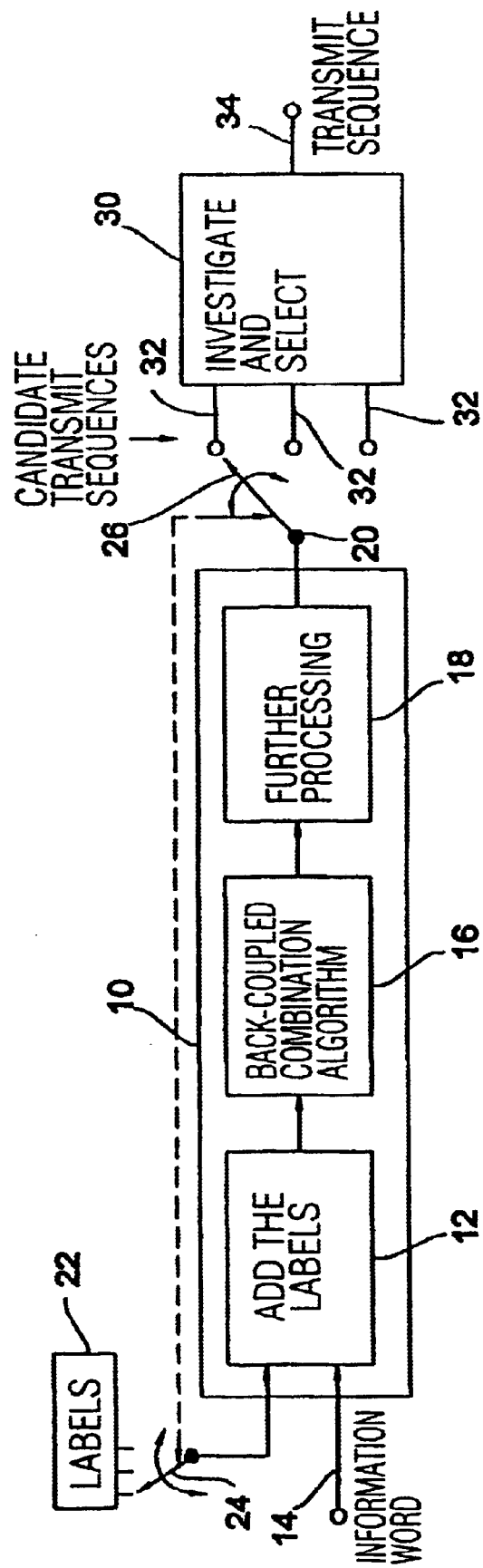
FIG. 1 shows a schematic block diagram of a device for generating a transmit sequence according to a first embodiment of the present invention.

FIG. 1 shows a device for generating a transmit sequence from an information word with a plurality of information units according to a first embodiment of the present invention. The device according to the first embodiment essentially comprises a unit 10 for forming a plurality of candidate transmit sequences and also a unit 30 for investigating the plurality of candidate transmit sequences and for selecting from the plurality of candidate transmit sequences a candidate transmit sequence as the actual transmit sequence, which fulfills a predetermined criterion.

The unit 10 for forming a plurality of candidate transmit sequences includes a unit 12 for adding a label to an information word that is supplied via an input 14. The information word plus label is then fed into a unit 16 for processing the information word plus the added labels by means of an invertable back-coupled combination algorithm so as to obtain at the output of the unit 16 a combined information word wherein the information units are combined with one another and/or with the inserted label in such a way that the combined information word is uniquely identified by the label. A combined information word thus generated is then fed into a unit 18 for further processing of the combined information word, the unit 18 for further processing being so adapted that a temporal candidate transmit sequence is generated from the combined information word. Such a candidate transmit sequence appears at an output 20 of the unit 10 for forming a plurality of candidate transmit sequences. The unit 10 for forming the plurality of candidate transmit sequences is furthermore so adapted as to fetch a new label from a label store 22 by means of a label switch 24 after a candidate transmit sequence has been produced simultaneously with the label switch 24 an output-side candidate transmit sequence switch 26 is actuated so as to supply a new candidate transmit sequence to another input 32 of the unit 30 for investigating and selecting.

Once the unit 30 for investigating and selecting has received all the candidate transmit sequences, whose number typically corresponds to the number of labels available, the investigation and selection step commences. The individual candidate transmit sequences, which are temporal candidate transmit sequences, are investigated in respect of their signal properties, after which a candidate transmit sequence is chosen as transmit sequence, which fulfills a predetermined criterion. Various possibilities exist for the predetermined criterion and these can also be used in combination. It should be remembered that the fundamental aim of the concept according to the present invention is to reduce the power margin in the transmitter amplifier in a practicable and robust manner without the out-of-band radiation exceeding a tolerance level. The out-of-band radiation will exceed a tolerance level, however, if the HF transmitter amplifier which is used is forced into its non-linear region due to too large an input signal, i.e. due to too large a temporal value.

The most exact criterion consists in calculating on the basis of the transmitter characteristic the out-of-band radiation generated by each candidate transmit sequence and then taking as transmit sequence at the output 34 of the unit 30 the candidate transmit sequence which produces the smallest out-of-band radiation. In this case, therefore, the predetermined criterion is the least out-of-band radiation.

This method is relatively complex, however. Simpler, but less exact, is a method in which the smallest peak value is taken as the criterion. Here all the sampled values of each candidate transmit sequence are investigated in order to discover the candidate transmit sequence having the smallest peak value, i.e. if complex temporal sampled values are involved, having the smallest absolute magnitude of the complex sampled values.

A further method for investigating and selecting, which lies between the two methods cited above as far as the outlay is concerned, consists in determining the average power of the individual candidate transmit sequences and selecting the candidate transmit sequence with the smallest average power as the transmit sequence. The last method takes account of the case where, simply on the basis of a decision as to the largest peak value, an otherwise advantageous candidate transmit sequence would be rejected due to a single high peak value for example, instead of which a candidate transmit sequence without such a high peak value but which generates a considerable amount of out-of-band radiation due to other relatively high peak values would be chosen as the transmit sequence.

In the concept shown in FIG. 1 serial processing takes place. In other words, the units 12, 16 and 18 only exist once, these being provided serially with different labels and the same information word so as to calculate the individual candidate transmit sequences one after the other. Alternatively there may be a multiplicity of the units 12, 16, 18 so as to achieve parallel calculation of the candidate transmit sequences, a different label being introduced into each parallel path. Mixed serial/parallel solutions are also possible if desired.

It should be noted that the transmitter amplifier is naturally dealing with a continuous temporal transmission signal after a D/A conversion and specific pulse shaping. Thus the general concept of forming candidate transmit sequences and of selecting the candidate transmit sequence which satisfies a predetermined criterion would be most precise if the continuous analog time signal were to be investigated before the up-conversion onto the HF carrier. It turns out, however, that a good approximation is achieved e.g in the case of an OFDM modulation method if the discrete complex temporal OFDM symbols at the output of the IDFT block are investigated, which has the advantage that no analog processing units, or further digital/analog converters and analog/digital converters, are needed in order to analyse the candidate transmit sequences in regard to their properties. If, however, e.g. in the case of a single-carrier modulation, a pulse shaping filter with a relatively steep frequency response in the transition region is used, this approximation may not be satisfactory and continuous temporal candidate transmit sequences must be investigated instead of discrete temporal candidate transmit sequences.

Figure 2:
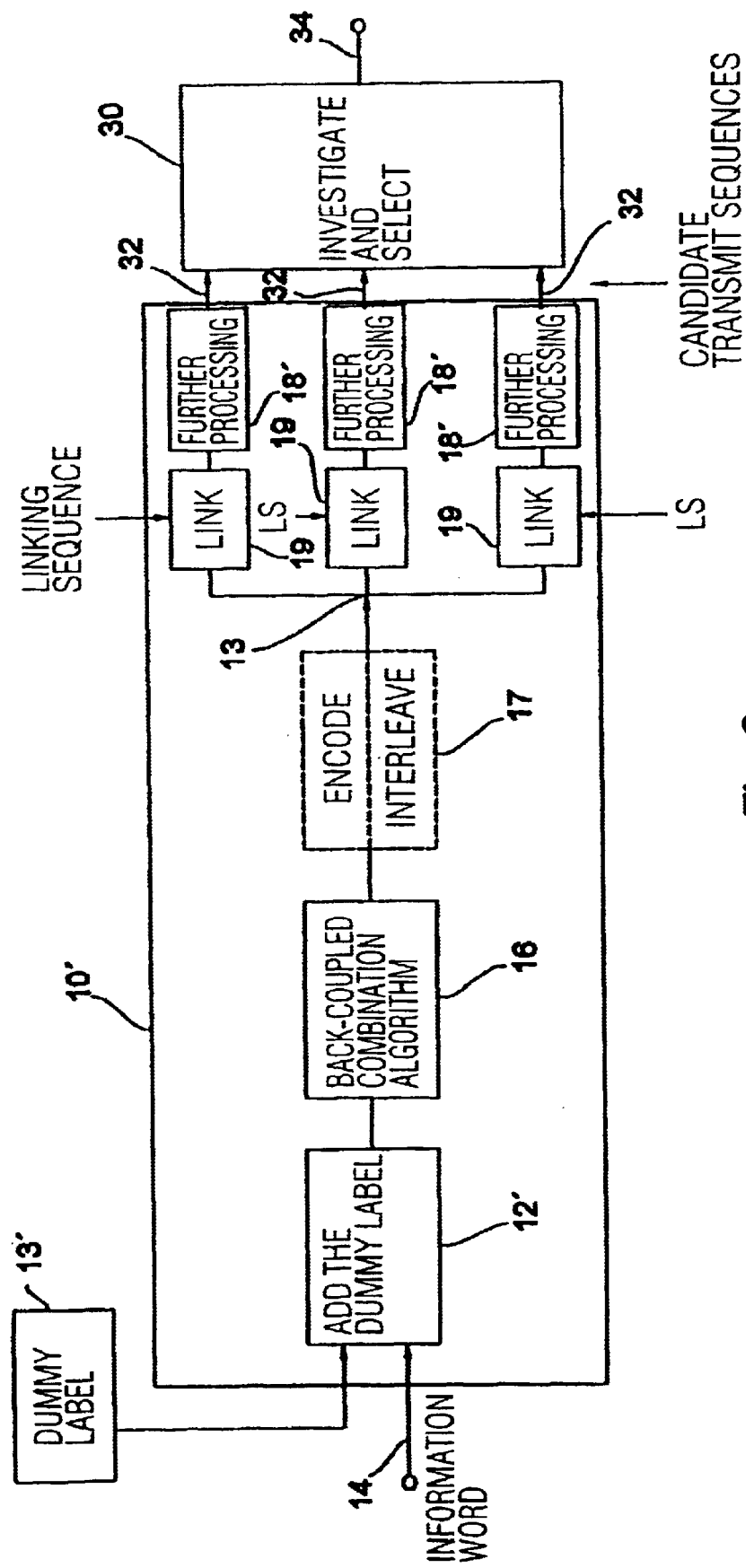
FIG. 2 shows a schematic block diagram of a device for generating a transmit sequence according to a second embodiment of the present invention.

FIG. 2 shows an implementation, equivalent to that in FIG. 1, of a device for generating a transmit sequence according to a second embodiment of the present invention. The same reference numerals indicate the same or similar elements. The device according to the second embodiment of the present invention also comprises a unit 10' for forming the plurality of candidate transmit sequences and a unit 30 for investigating and selecting in order to supply the transmit sequence on the output side. The unit 30 again has an output 34, at which the transmit sequence is output, and a number of inputs 32, the number of inputs corresponding to the number of candidate transmit sequences. The unit 10' for forming the plurality of candidate transmit sequences has an input 14, at which the information word to be processed must be fed in, from which the plurality of candidate transmit sequences at the outputs 32 of the unit 10' are to be generated.

In contrast to the first embodiment shown in FIG. 1, however, the combination of the information word with the label now takes place essentially in two stages, a unit 12' for adding a dumay label simply supplying a dummy label from a dummy label store 13'. The information word plus dummy label is then processed in a unit 16 for performing an invertable back-coupled combination algorithm, as in FIG. 1, to obtain a combined information word in which the information units of the information word are combined with one another and/or with the inserted dummy label. As an option, the circuit may include a unit for channel encoding and/or for interleaving, denoted by the reference numeral 17, following the unit 16. If the unit 17, which is completely optional, is missing, the combined information word is fed into a number of linking units 19. If the unit 17 is present, however, instead of the combined information word a word derived from the combined information word is fed into the linking units 19, the derivation rule corresponding to the processing rules of block 17.

In the units 19 for linking, the combined information word, which simply—implicitly—contains a dummy label, is linked with different linking sequences to obtain a linked information word, which is unambiguously identified by the respective label. The individual linking sequences (LS) are formed by taking a label, as it is present in the unit 22 of FIG. 1, and subjecting it to the same processing as the information word at the input 14 of FIG. 2, so that the linking sequence is the processed label. Through the linking with the respective processed label the actual information of the label is entered instead of the dummy label, so that the different candidate transmit sequences appear at the output of the linking unit 19. These are then fed into respective further-processing units 18', optionally identical in each branch, so as to obtain again temporal candidate transmit sequences which, as has been described above, can be either discrete-time candidate transmit sequences as in the case of OFDM modulation or pulse shaped continuous-time transmit sequences as in the case of single-carrier modulation with a pulse shaping filter.

The concept according to the present invention shown in FIG. 2 has the advantage that during actual operation the units 12, 16 and optionally 17 only have to be traversed once to generate the combined information word, or the word derived from the combined information word, which is then distributed to the different linking units at a distribution point 13. In the second embodiment of the present invention shown in FIG. 2 the label is also subjected to processing by the units 12, 16 and optionally 17, as in the first embodiment, but this does not have to occur during the actual transmission but can be performed "off-line" as it were. Thus the linking sequences can, to advantage, be calculated outside the actual operation and e.g. be stored in a ROM memory, so that during operation of the digital transmitter the individual linking sequences, the number of which corresponds to the number of labels and thus to the number of different candidate transmit sequences, simply have to be retrieved. Fast operation is thus possible.

The second embodiment of the present invention shown in FIG. 2 again also provides for purely serial, purely parallel or mixed serial/parallel processing to calculate the plurality of candidate transmit sequences. If purely serial processing is used, only a single unit 19 and a single unit 18' are present, a new linking sequence always being fed into the single unit 19 after calculation of a candidate sequence so as to calculate the individual candidate transmit sequences one after the other. Depending on the functionality of further processing, a compromise will result according to whether these operations are complicated and thus better performed serially or are not complicated and can therefore by implemented in parallel, whereby, for each application, an optimal compromise can always be found, which in the final analysis, thinking of the integration of the complete functionality shown in FIG. 1 and FIG. 2 on an application-specific integrated circuit, will come down to a compromise between chip area, power consumption, size, Cost, etc.

Figure 3:
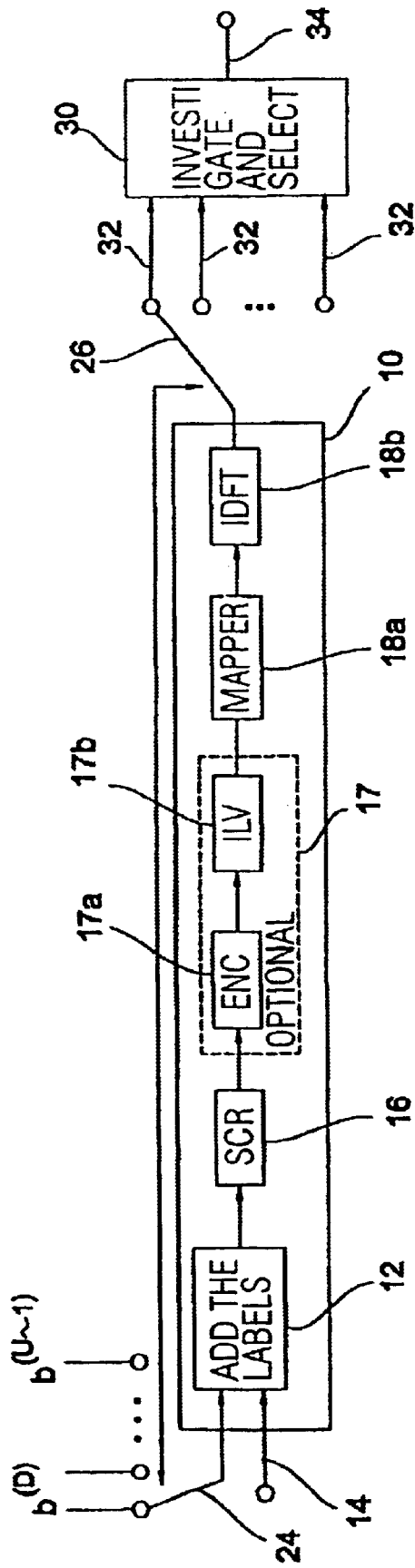
FIG. 3 shows an application of the device shown in FIG. 1 for an OFDM modulation.

FIG. 3, which shows a practical implementation of the first embodiment of the present invention represented in general terms in FIG. 1, will now be considered. FIG. 3 relates to the OFDM modulation method, which generally has a very high PAR due to the inverse discrete Fourier transform used to generate a temporal OFDM symbol from an information word. In general a certain number of orthogonal subcarriers with the same interval as regards frequency are used in the OFDM method. The frequency multiplex method is implemented by an inverse discrete Fourier transform in the transmitter. Binary data are generally mapped onto subcarrier amplitudes according to a modulation method, such as e.g. QPSK, QAM, etc. OFDM can be employed in such a way that each subcarrier receives the same signal constellation or, alternatively, so that certain subcarriers receive different signal constellations. For example, some subcarriers could be QPSK modulated while the other subearriers could be 16-QAM modulated.

The vector of the subcarriers, i.e. in actual fact the vector of the modulation symbols modulated onto the individual subcarriers, is then transformed into the time domain by an IDFT to obtain an OFDM symbol which consists of a number of temporal sampled values determined by the transform. The sampled values can then be converted into a continuous time signal by means of a conventional pulse amplitude modulation so as to be amplified in the transmitter amplifier after conversion onto a HF carrier frequency.

In the following FIG. 3 is considered. Elements which are the same as those in FIG. 1 have the same reference numerals. It should be noted that the unit 16 for performing the invertable back-coupled combination algorithm is termed a scrambler in FIG. 3 and in FIG. 4 in order to draw attention to the preferred implementation of the invertable back-coupled combination algorithm with the aid of a binary shift register. In FIG. 3 the scrambler 16 is followed by an optional group of function blocks denoted by the reference numeral 17. The group 17 of function blocks comprises a redundancy-adding channel encoder 17a, which is denoted by ENC, followed by an interleaver, which is denoted by ILV and has the reference numeral 17b. It is also possible for the encoder 17a to be present on its own and for the interleaver 17b to be present on its own. The channel encoder is e.g. an FEC encoder (FEC=Forward Error Correction), which adds redundancy to the scrambled information word according to a certain code rate smaller than one. Typically such FEC encoders are realized with the aid of a forward-coupled binary shift register consisting of delay units and XOR operations, as will be explained making reference to FIG. 9.

The channel-encoded and interleaver-processed information word is then passed on to a mapper, which performs both a serial/parallel conversion and also a mapping of bits of the interleaver output signal according to the signal constellation, i.e. the modulation method. If a QPSK modulation is used for all subcarriers, the mapper 18a first groups the information word into 2-bit groups, also called dibits, four phase states in the complex plane being assigned to the four possible dibit combinations. To this end the mapper 18a performs a serial/parallel conversion of the dibits to generate a vector of dibits which can be subjected to the IDFT operation in block 18b. An OFDM symbol, consisting of a sequence of discrete temporal sampled values, is then present at the output of the IDFT block. In the embodiment described here there is no conversion into a continuous-time signal prior to the investigation and selection in block 30 since the linear filtering effected by the IDFT operation makes the decisive contribution to high peak values in the OFDM symbol.

Figure 4:
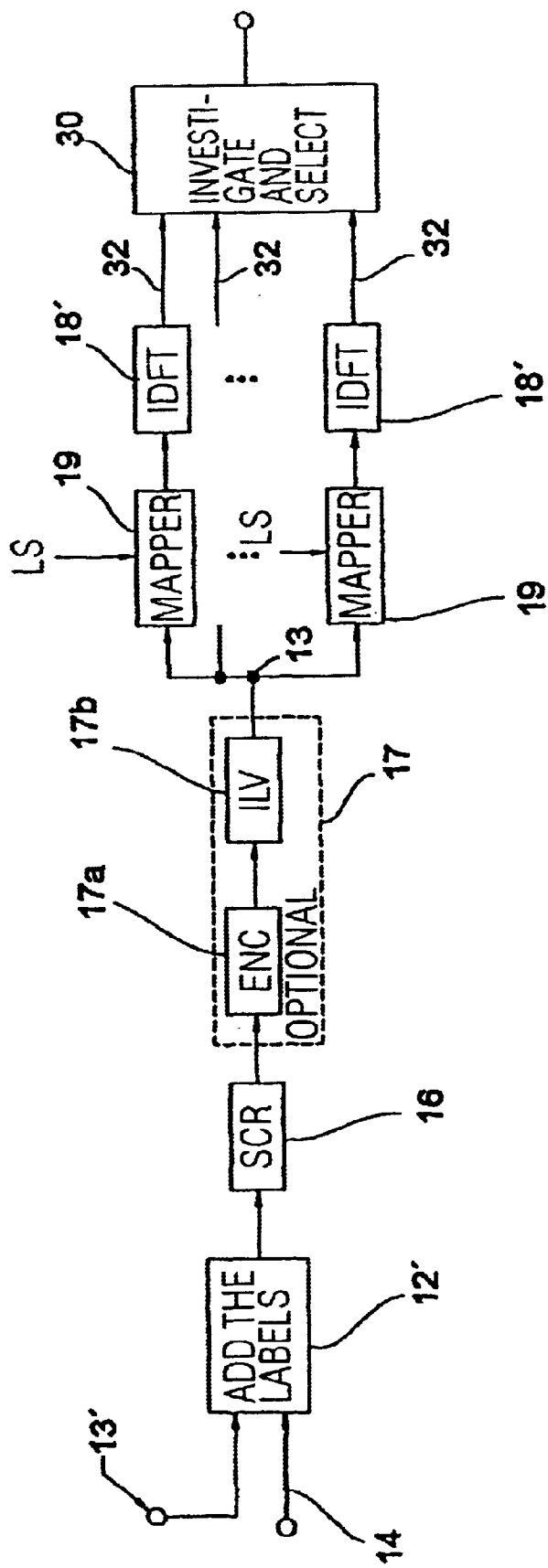
FIG. 4 shows an application of the device shown in FIG. 2 for an OFDM modulation.

The embodiment shown in FIG. 4 relates to an OFDM application of the second embodiment of the present invention shown in FIG. 2. In contrast to the embodiment shown in FIG. 3, the information word at the input 14 no longer has different labels assigned to it either serially or in parallel but simply a single dummy label 13', which is denoted by "o". The information word with dummy label is then scrambled and optionally encoded and interleaved as before, and is then, at a branching point 13, applied to the mappers 19, which form the dibits and also perform serial/parallel conversion of the same and in addition perform the linking operation which has been described with reference to FIG. 2. In the second embodiment of the present invention in its OFDM application shown in FIG. 4, only a single interleaved code word has to be generated. Because of a linearity in the Galois field of dimension 2 (GF(2)) of the invertable back-coupled combination algorithm, the encoder and the interleaver, the scrambling of the information word plus dummy label can be separated from the actual scrambling of the different labels, so that the scrambled and optionally encoded and interleaved labels can be supplied to the mappers 19 as linking sequences in such a way that the individual candidate transmit sequences are unambiguously identified by the labels on which the corresponding linking sequences are based. It should be noted that the linking sequences need only be calculated once, and preferably "off-line", and can be stored in a ROM memory in such a way that the embodiment of the present invention shown in FIG. 4 can be calculated quickly. The linked information words at the output of a mapper 19 are then further processed with the aid of an IDFT block 18' in such a way that a temporal candidate transmit sequence is generated, which is then fed into the unit 30 for investigation and selection.

Figure 11:
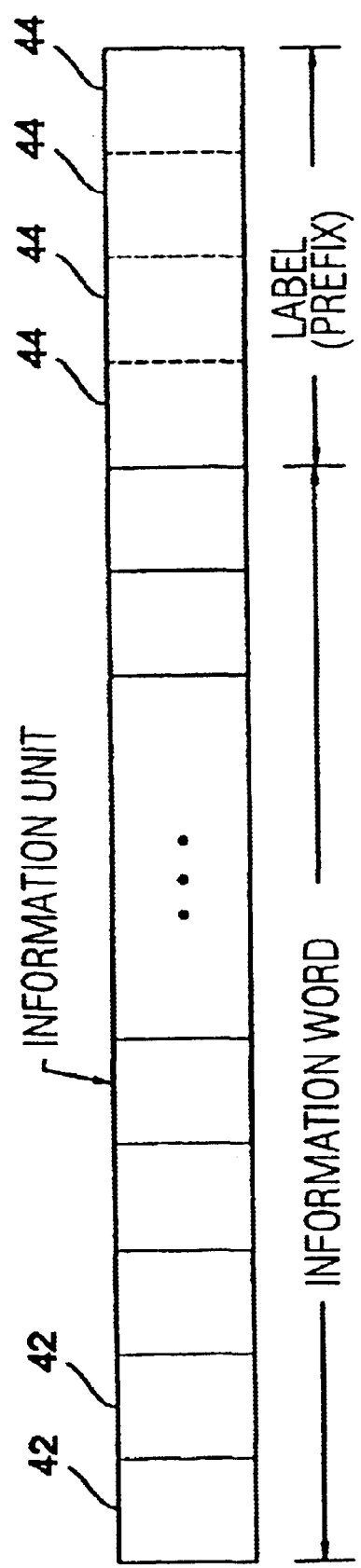
FIG. 11 shows a schematic representation of an information word with label prior to the processing by an invertable back-coupled combination algorithm.

In,the following FIG. 11 is considered in order to explain the structure of an information word. An information word 40, as it is fed at input 14 into the device for generating a transmit sequence, consists of a plurality of individual information units 42, which in the case of a binary implementation are individual bits. According to a preferred embodiment of the present invention, either an actual label or a dummy label is prefixed to the information word 40 by the unit 12 or 12' for adding a label (FIG. 1 to FIG. 4). It should be noted that the dummy label has the same length as an actual label. Typically the actual label and thus the dummy label consists of a number of individual bits 44, the number of label bits 44 determining the number of possible candidate transmit sequences. In the case of a binary implementation of the concept according to the present invention, four label bits already suffice to identify 16 candidates unequivocally. In a simple implementation even just one label bit, with which two different candidate transmit sequences can be generated, is sufficient. The invertable back-coupled combination algorithm is preferably adapted to the label in such a way that its memory can assume as many different states as the number of different numbers which can be represented by the number of label bits, i.e. how many unequivocally distinguishable candidate transmit sequences can be generated.

Figure 5:
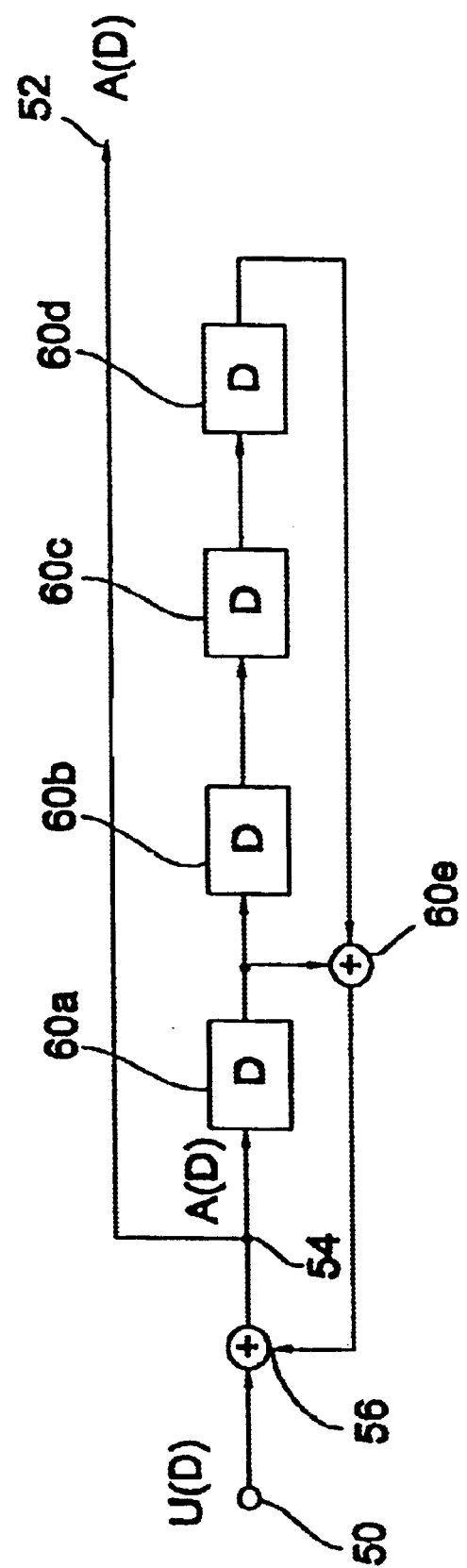
FIG. 5 shows a back-coupled shift register as an example of an implementation of the invertable back-coupled combination algorithm.

In the following FIG. 5 is considered, which represents an implementation example of the invertable back-coupled combination algorithm. The invertable back-coupled combination algorithm can for example be implemented by means of a back-coupled shift register which has a certain number of delay units, denoted by D in FIG. 5, and in addition a certain number of XOR operations.

In detail the shift register shown in FIG. 5 implements an invertable back-coupled combination algorithm which can be described by a polynomial $1+D+D^4$, where the sign "+" stands for an XOR operation, which is also called an exclusive OR operation. As is known, an XOR operation obeys the following rules:

0+0=0
0+1=1
1+0=1
1+1=0

In general it can be said that a scrambler which performs the invertable back-coupled combination algorithm can be a back-coupled binary shift register, which strongly resembles a digital filter. In the case of a binary implementation each delay element D stores one bit, which has a value of 0 or a value of 1, and passes this on to the next delay element, if there is one, in the next time step. It should be noted that D in the binary shift register stands for $z^{-1}$ in digital filters, where the signal sequence would be denoted by A(z) whereas here the signal sequence is represented by A(D).

The representative shift register shown in FIG. 5 has an input 50 and an output 52. The binary input sequence U(D), which is the information word plus label, is present at the input. The combined information word A(D) is present at the output. The shift register shown in FIG. 5 comprises a feedback path, which at one end 54 is connected to the output and which at its other end 56 is connected to one of the two inputs of an XOR operation which is connected to the input 50 of the shift register via its other input in the example of a shift register shown in FIG. 5 the feedback path comprises a first delay element 60a, a second delay element 60b, a third delay element 60c and a fourth delay element 60d and also an XOR operation 60e, which links the output value of the first delay element 60a with the output value of the fourth delay element 60d by an XOR operation to generate the signal at the second end 56 of the feedback path. By analogy, as in the case of a digital filter the feedback path for a binary shift register can also be described by a polynomial. Since, in the embodiment shown here, branches are present after the first and the fourth D element, it follows that:

$$A(D)=U(D)+D \cdot A(D)+D^4 \cdot A(D)$$

resulting in the following transfer function:

$$A(D)/U(D)=1+D+D^4.$$

The feedback polynomial can thus be described by $1+D+D^4$. It should be noted that a feedback polynomial of any type can be generated by a shift register with the aid of delay elements and XOR operations. Since both the delay operations and the XOR operations are linear-operations in GF(2), it is possible to "Split" the operation of the shift register in such a way that in the case of the second embodiment of the present invention shown in FIG. 2 the same result can be achieved as in the first embodiment shown in FIG. 1 by processing the information word with dummy label and by subsequent linking with a linking sequence.

In the following the general operation of back-coupled shift registers is considered in order to clarify the properties of invertable back-coupled combination algorithms. If U(D) is an impulse, i.e. a "1" followed by a series of zeros, then the impulse response of the scrambler, i.e. of the shift register shown in FIG. 5, is a sequence of ones and zeros of infinite length which appears as a random sequence.

Figure 6:
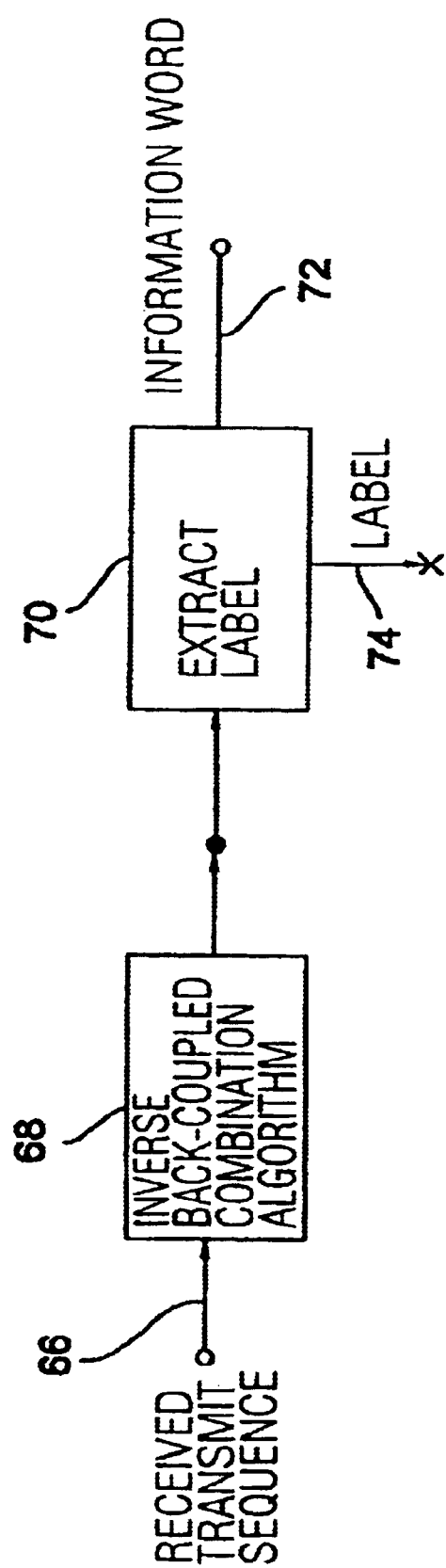
FIG. 6 shows a schematic block diagram of a device according to the present invention for determining an information word from a transmit sequence in a digital receiver.

This sequence is thus also referred to as a pseudo-noise sequence (pn sequence) in the technological field. The scrambler is a linear device, since only XOR and delay operations are involved, which are linear in terms of XOR arithmetic. The shift register is therefore also invertable, so that an invertable shift register can be achieved, which is then incorporated in the descrambler in the receiver (FIG. 6).

If e.g a "1" is added as prefix or label to a sequence $U_1(D)$ which is to be scrambled, i.e. if $$U(D)=[1U_1(D)]$$

as is accomplished by the unit 12 or 12', the pn sequence belonging to the "1", i.e. to the label, superimposes itself linearly on the output sequence $A_1(D)$ belonging to $U_1(D)$, so that $$A(D)=[1(A_1(D)+pn \text{ sequence})]$$

A(D) thus looks quite different to $A_1(D)$, a result which has been achieved by the label alone, which in the example was a If, on the other hand, a "0" is inserted before $U_1(D)$, we have $$A(D)=[0A_1(D)]$$

In a preferred embodiment instead of a label which is just one bit long a label several bits long is inserted before the sequence $U_1(D)$ to be transmitted so as to obtain not just two different candidate transmit sequences (for a single 0 and for a single 1) but e.g. 16 different candidate transmit sequences. In this case the output sequence $A_1(D)$ now has a plurality of time-displaced pn sequences superimposed on it. The resulting output sequence A(D) thus looks to be random and differs markedly from the output sequences for other labels so that the probability increases that a candidate transmit sequence with a low peak value is contained therein.

To make matters clearer, the function of the label can also be described as follows: the label, which enters the shift register first, drives the shift register into a certain state starting from which the information word following the label in the input sequence is then scrambled, i.e. processed by the invertable back-coupled combination algorithm.

It should be noted that, before generation of another candidate transmit sequence using another label, all the delay units in the feedback path of the shift register must be reset to a defined state, which is preferably the 0 state and which is preferably also the state represented by the dummy label.

As has already been explained, it is not important that the unit for adding the labels or the dummy label places the label directly as a prefix before the information word, rather it suffices in principle that the label is added to the information word somewhere, so that it can be combined with the information word. The further forward the label is, however, the more varied the individual candidate transmit sequences are as a whole if an interleaver is not used. If an interleaver is employed, however, the influence of the location of the label in/at the information word on the variety of the candidate transmit sequences is reduced. In this case, however, the receiver must also know where the label is located in the information word in order to extract it and so obtain the information word without the label.

In the following FIG. 6 is considered, which shows a device according to the present invention for determining an information word from a received transmit sequence (after preprocessing by a de-interleaver and channel decoder) which may be present in a digital receiver. A received transmit sequence is fed in at an input 66. The task now consists in reversing the combination operation carried out in the transmitter so as to obtain the information word. To achieve this, the received transmit sequence is processed with the aid of an algorithm which is the inverse of the back-coupled combination algorithm which was used in the transmitter to generate the received transmit sequence. This is achieved by means of a unit 68 which, apart from transmission errors, outputs the information word plus label shown in FIG. 11. Now it is only necessary to extract the label 70 to obtain the information word at an output 72. It should be noted that the label itself is not explicitly required since it has already served to drive the inverse back-coupled combination algorithm, which is now a forward-coupled algorithm due to the inversion, into an initial state which is related to the initial state produced in the transmitter by the label. The label can thus be dispensed with, as is represented schematically at 74 in FIG. 6.

Figure 7:
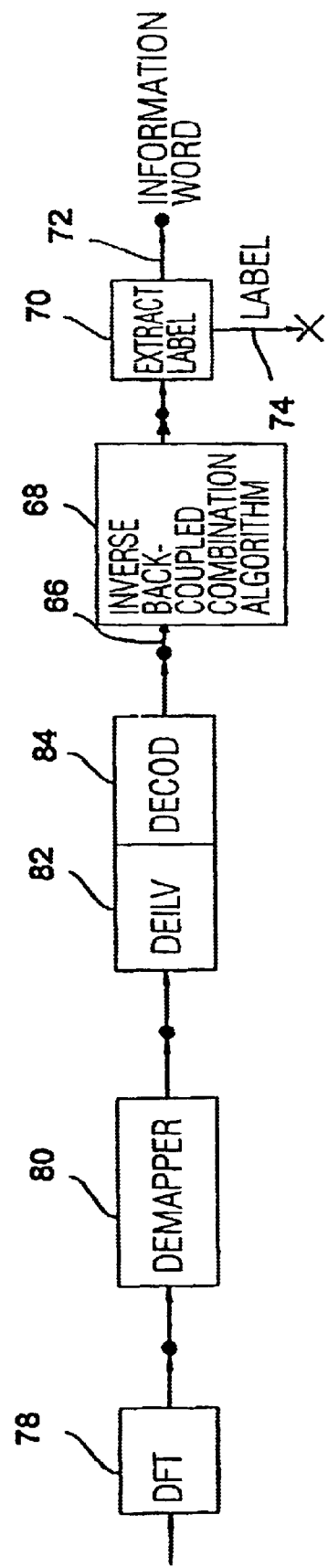
FIG. 7 shows an application to an OFDM receiver of the receiver section shown in FIG. 6.

FIG. 7 shows an implementation of the receiver concept according to the present invention shown in FIG. 6 using the example of an OFDM receiver, which first performs a forward Fourier transform to demodulate the OFDM subcarriers, this being represented by a block DFT 78 in FIG. 7. An operation which is inverse to the function of the mapper in the transmitter then takes place in a demapper 80, whereupon an optional interleaving is reversed 82 and whereupon a channel encoding is also reversed again, it being possible to use a Viterbi decoder 84 e.g. for this purpose.

It should be noted that the unit 68 for performing the inverse algorithm, like the unit 16 for performing the back-coupled combination algorithm in the transmitter (FIGS. 1 to 4), must be reset to a defined state, preferably the 0 state, prior to each decoding of an information word only then may the information word output by the decoder 84 be fed in, which directly causes the delay units in the forward-coupling branch to assume a certain state due to the label, starting from which the combined information word is then decombined.

It should be noted that the receiver is explicitly able, as a by-product as it were, to determine the candidate number or the label but that it does not explicitly require this information in order to retrieve the data.

Figure 8:
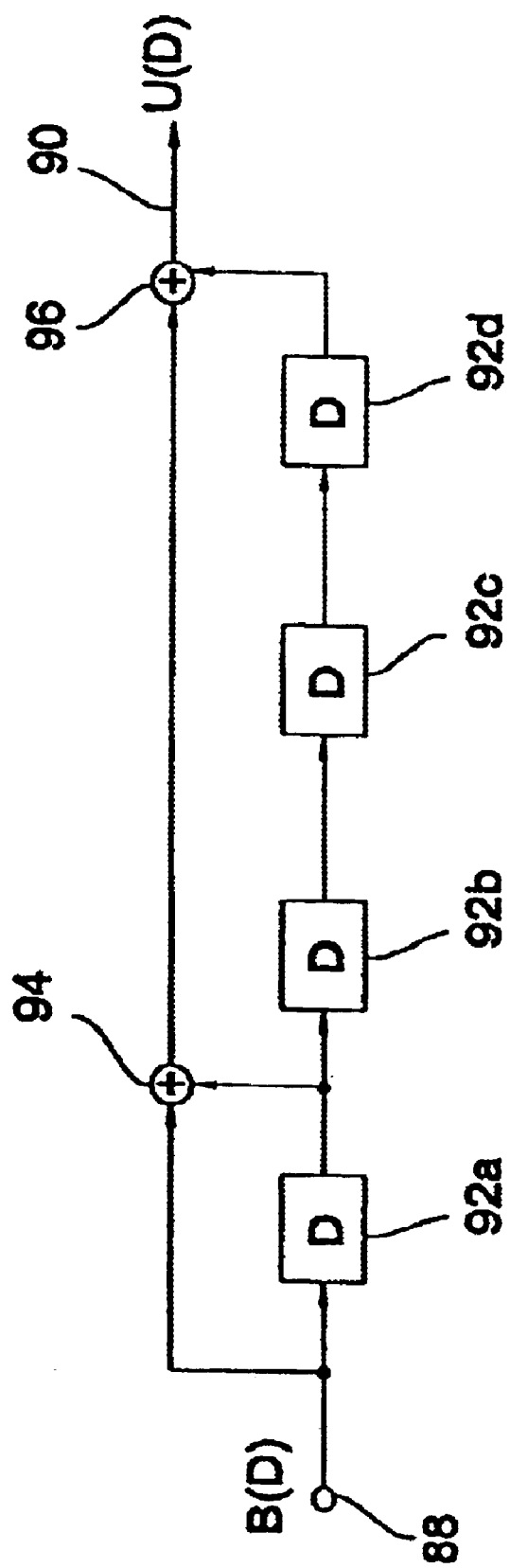
FIG. 8 shows an example of an implementation of the algorithm which is inverse to the back-coupled combination algorithm employing a forward-coupled shift register.

The forward-coupled binary shift register (FIG. 8) has an input 88 and an output 90. The combined information word plus combined label, denoted by B(D), is present at the input. This received transmit sequence is fed in bit by bit to successively bring the four delay units 92a–92d to their desired states in order to decombine or descramble the combined information word being fed in bit by bit at the input 88. Accordingly, the binary shift register shown in FIG. 8 again has two XOR linking units 94 and 96. The output sequence at output 90, which is again denoted by U(D), is then fed into the unit 70 for extracting the label (FIG. 6, FIG. 7) to obtain finally the information word.

Figure 9:
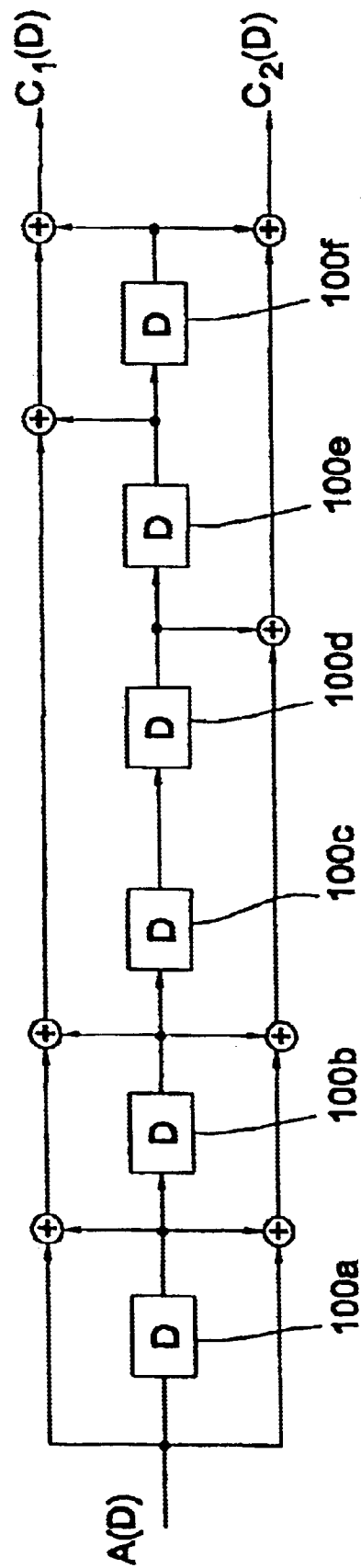
FIG. 9 shows an example of a redundancy-adding channel encoder in the shift register embodiment.
Figure 10:
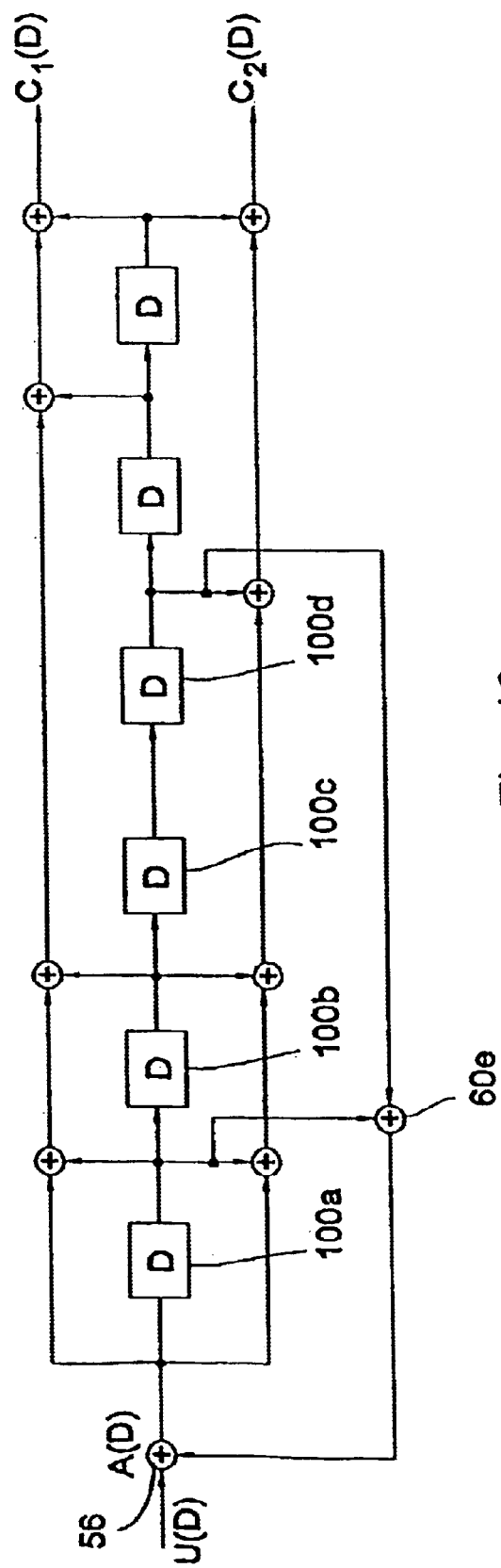
FIG. 10 shows an example of a favourable implementation of the channel encoder of FIG. 9 and of the back-coupled shift register of FIG. 5 with common use of certain delay units.

If a convolution code has been employed in the redundancy adding channel encoder 17a (FIG. 3, FIG. 4), it is very likely that here too a shift register, though forward coupled, will have been used for the purpose, in order e.g. as is shown in FIG. 9 to generate two output bits $C_1(D)$ and $C_2(D)$ from an input bit A(D) if a code rate of ½ has been used. A typical FEC shift register of this kind comprises a number of different delay units 100a–100f together with corresponding XOR linking points, as shown in FIG. 9. Since the invertable back-coupled combination algorithm can also be implemented by means of a binary shift register, certain delay elements, such as the delay elements 100a–100d e.g., can be used twice or jointly, i.e. by the channel encoder and by the scrambler. To implement the scrambler it is thus necessary to additionally provide only the XOR linking points 56 and 60e and the two connection lines to these XOR linking points, so that only a minimum number of additional elements is required.

As has already been explained, the additional redundancy in the form of the bits for the labels is small. The case where there are 256 OFDM subcartiers available for multicarrier modulation may serve as an example. Of the 256 available OFDM subearriers only 219 subcarriers are utilized. An information word will therefore have a length of 215 bits, so that after adding the label, which comprises four-bits in the present example, the result is again 219 bits. It should be noted that, if a QPSK signal constellation is used, as in the present case, two bits can be mapped onto an OFDM subcarrier. Since, in the present example, the channel encoder 17a has introduced an information redundancy of 2, or has a code rate of ½, however, there is an exact one-to-one correspondence between the information bits and the subcarriers. The inverse Fourier transform of the 256 OFDM subcarriers then supplies 256 complex sampled values or 512 real sampled values, of which 256 sampled values are real parts and the other 256 sampled values are the imaginary parts associated with the real parts. The additional redundancy due to the label thus amounts to four bits out of 219 bits, which is of very little significance for practical applications and does not in practice result in a higher signal bandwidth or data rate.

Compared with an OPDM method without different transmit sequences and selection of the best transmit sequence, the out-of-band radiation can be reduced by almost 10 dB near the boundary of the permissible band by the method according to the present invention. If the out-of-band radiation is left unchanged, the power margin of the transmitter power amplifier amplifier can be reduced by the order of 3 dB by the concept according to the present invention.

What is claimed is:

1. A device for generating a transmit sequence from an information word with a plurality of information units, comprising the following features:
   a unit for forming a plurality of candidate transmit sequences from the information word, each candidate transmit sequence carrying the same information as the information word, where the unit for forming comprises the following features:
      a unit for adding a label to the information word;
      a unit for processing the information word plus added label by means of an invertable back-coupled combination algorithm to obtain a combined information word wherein the information units are combined with one another and/or with the added label in such a way that the combined information word is uniquely identified by the label; and
      a unit for further processing the combined information word to obtain a temporal candidate transmit sequence,
      where the unit for forming is furthermore so adapted as to generate the plurality of distinct candidate transmit sequences from the same information word with the aid of different labels; and
   a unit for investigating the plurality of candidate transmit sequences so as to select from the plurality of candidate transmit sequences the candidate transmit sequence which fulfills a predetermined criterion to be the transmit sequence.

2. A device for generating a transmit sequence from an information word with a plurality of information units, comprising the following features:
   a unit for forming a plurality of candidate transmit sequences from the information word, each candidate transmit sequence carrying the same information as the information word, where the unit for forming comprises the following features:
      a unit for adding a dummy label to the information word;
      a unit for processing the information word plus added dummy label by means of an invertable back-coupled combination algorithm to obtain a combined information word wherein the information units are combined with one another and/or with the added dummy label;
      a unit for linking the combined information word or a word derived from the combined information word with a linking sequence which is determined from a label using the same back-coupled combination algorithm so as to obtain a linked information word which is unambiguously identified by the label; and
      a unit for further processing the linked information word to obtain a temporal candidate transmit sequence,
      where the unit for forming is furthermore so adapted as to generate the plurality of distinct candidate transmit sequences from the same information word with the aid of different linking sequences which are determined from different labels; and
   a unit for investigating the plurality of candidate transmit sequences so as to select from the plurality of candidate transmit sequences the candidate transmit sequence which fulfills a predetermined criterion to be the transmit sequence.

3. A device according to claim 1, wherein the unit for processing by means of an invertable back-coupled combination algorithm comprises a shift register having the following features:
   an input;
   an output;
   a feedback path with a first and a second end which has the first end connected to the output and which includes at least one delay unit; and
   an XOR linking unit for linking an information unit at the input with a value at the second end of the feedback path by means of an XOR operation and where the XOR linking unit is connected on its output side with the output.

4. A device according to claim 2, wherein the unit for processing by means of an invertable back-coupled combination algorithm comprises a shift register having the following features:
   an input;
   an output;
   a feedback path with a first and a second end which has the first end connected to the output and which includes at least one delay unit; and
   an XOR linking unit for linking an information unit at the input with a value at the second end of the feedback path by means of an XOR operation and where the XOR linking unit is connected on its output side with the output.

5. A device according to claim 1, wherein the labels indicate different states in a backward coupling of the back-coupled combination algorithm.

6. A device according to claim 3, wherein the feedback path of the shift register comprises the following features:
   a first delay unit which is connected between the first end of the feedback path and a first node;
   a second delay unit which is connected between the first node and a second node;
   a third delay unit which is connected between the second node and a third node;
   a fourth delay unit which is connected between the third node and a fourth node; and
   an XOR linking unit which is connected on its input side with the first node and the fourth node and which on its output side forms the second end of the feedback path.

7. A device according to claim 1, wherein the unit for adding a label places the label before the information word as a prefix.

8. A device according to claim 1, wherein the unit for further processing is preceded by a redundancy encoder and/or an interleaver.

9. A device according to claim 1, wherein the unit for further processing also comprises the following features:
  a mapper for generating modulation values for a plurality of subcarriers; and
  a unit for performing an inverse Fourier transform on the modulation values assigned to the subcarriers to transform them into the time domain so as to obtain an OFDM symbol as temporal candidate transmit sequence.

10. A device according to claim 1, wherein the unit for forming is adapted to generate the plurality of candidate transmit sequences one after the other, and which also comprises the following features:
  a first switch for serial provision of the individual labels to the unit for adding the labels;
  a second switch for serial provision of the temporal candidate transmit sequences to the unit for investigating and selecting; and
  a control unit for synchronous control of the first and second switches such that the switches are advanced by one position when a temporal candidate transmit sequence has been generated and supplied to the unit for selecting.

11. A device according to claim 1, wherein the unit for processing by the back-coupled combination algorithm is implemented by a back-coupled shift register with at least one delay unit in the feedback path and wherein the unit for further processing includes a redundancy encoder which is implemented as a forward-coupled shift register with at least one delay unit and where the two shift registers are coupled so as to make joint use of the at least one delay unit.

12. A device according to claim 2, wherein the unit for adding the dummy label places the dummy label before the information word as a prefix.

13. A device according to claim 2, wherein the unit for forming a plurality of candidate transmit sequences comprises the following features:
  a unit for redundancy encoding the combined information word and/or a unit for interleaving the redundancy-encoded information word, or the combined information word, so as to obtain the word derived from the combined information word.

14. A device according to claim 2, wherein the unit for linking comprises the following feature:
  a storage unit for storing the different linking sequences which are determined from the different labels.

15. A device according to claim 2, wherein the unit for processing by the back-coupled combination algorithm is implemented by a back-coupled shift register with at least one delay unit in the feedback path and wherein the unit for further processing includes a redundancy encoder which is implemented as a forward-coupled shift register with at least one delay unit and where the two shift registers are coupled so as to make joint use of the at least one delay unit.

16. A device according to claim 2, wherein the unit for further processing the linked information word comprises the following features:
  a mapper for generating modulation values for a plurality of subcarriers; and
  a unit for performing an inverse Fourier transform on the modulation values assigned to the subcarriers to transform them into the time domain so as to obtain an OFDM symbol as temporal candidate transmit sequence.

17. A device according to claim 1, wherein the unit for investigating is adapted to employ as the predetermined criterion either the smallest peak value or the smallest out-of-band radiation or the lowest average power of the candidate transmit sequences or a weighted combination of the foregoing criteria.

18. A device for determining an information word from a received transmit sequence which has been generated by processing the information word and a label by means of an invertable back-coupled combination algorithm, comprising the following features:
  a unit for processing the received transmit sequence by means of an inverse algorithm to the invertable back-coupled combination algorithm so as to obtain a sequence which contains the information word and the label; and
  a unit for extracting the label from the sequence so as to obtain the information word.

19. A device according to claim 18, wherein the unit for processing includes a forward-coupled shift register which is the exact inverse of the back-coupled shift register used when generating.

20. A device according to claim 18, which receives a transmit sequence which had a label of a certain length placed before the information word when it was generated, the unit for extracting being adapted to detach and reject the section of the sequence whose length is the same as that of the label commencing at the beginning of the sequence so that the information word is left over.

21. A device according to claim 19, which receives a transmit sequence which had a label of a certain length placed before the information word when it was generated, the unit for extracting being adapted to detach and reject the section of the sequence whose length is the same as that of the label commencing at the beginning of the sequence so that the information word is left over.

22. A device according to claim 18, which receives a transmit sequence which was subjected to modulation, interleaving and/or redundancy encoding in a transmitter and which also comprises the following features:
  a unit for demodulating;
  a unit for reversing the interleaving; and/or
  a unit for channel decoding.

23. A device according to claim 18,
  which contains a unit to channel decode the channel code which is generated by the combination of a back-coupled shift register and a redundancy encoder, wherein the back-coupled shift register has at least one delay unit in the feedback path and wherein the unit for further processing includes a redundancy encoder which is implemented as a forward-coupled shift register with at least one delay unit and where the two shift registers are coupled so as to make joint use of the at least one delay unit, and which therefore encompasses the function both of a traditional decoder and of the forward-coupled shift register which is the exact inverse of the back-coupled shift register used when generating.

24. A method for generating a transmit sequence from an information word with a plurality of information units, comprising the following steps:
  forming a plurality of candidate transmit sequences from the information word, each candidate transmit sequence carrying the same information as the information word, where the step of forming comprises the following substeps:
    adding a label to the information word;
    processing the information word plus added label by means of an invertable back-coupled combination algorithm to obtain a combined information word wherein the information units are combined with one another and/or with the added label in such a way that the combined information word is uniquely identified by the label; and further processing the combined information word to obtain a temporal candidate transmit sequence, and where the step of forming is furthermore performed so as to generate the plurality of distinct candidate transmit sequences from the same information word with the aid of different labels; and investigating the plurality of candidate transmit sequences so as to select from the plurality of candidate transmit sequences the candidate transmit sequence which fulfills a predetermined criterion to be the transmit sequence.

25. A method for generating a transmit sequence from an information word with a plurality of information units, comprising the following steps:

forming a plurality of candidate transmit sequences from the information word, each candidate transmit sequence carrying the same information as the information word, where the step of forming comprises the following substeps:

adding a dummy label to the information word;

processing the information word plus added dummy label by means of an invertable back-coupled combination algorithm to obtain a combined information word wherein the information units are combined with one another and/or with the added dummy label;

linking the combined information word or a word derived from the combined information word with a linking sequence which is determined from a label using the same back-coupled combination algorithm so as to obtain a linked information word which is unambiguously identified by the label; and further processing the linked information word to obtain a temporal candidate transmit sequence, where the step of forming is furthermore performed so as to generate the plurality of distinct candidate transmit sequences from the same information word with the aid of different linking sequences which are determined from different labels; and investigating the plurality of candidate transmit sequences so as to select from the plurality of candidate transmit sequences the candidate transmit sequence which fulfills a predetermined criterion to be the transmit sequence.

\* \* \* \* \*